Dec. 24, 1946.   W. C. POPE   2,413,192
CABLE SLITTING MACHINE
Filed Oct. 16, 1944   2 Sheets-Sheet 1
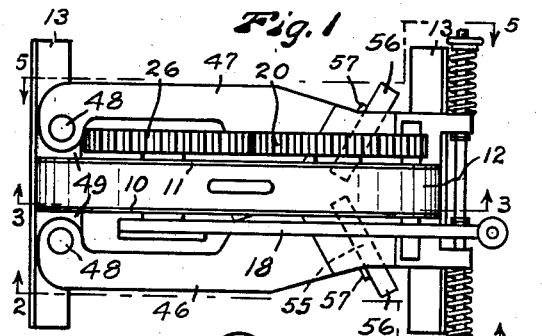
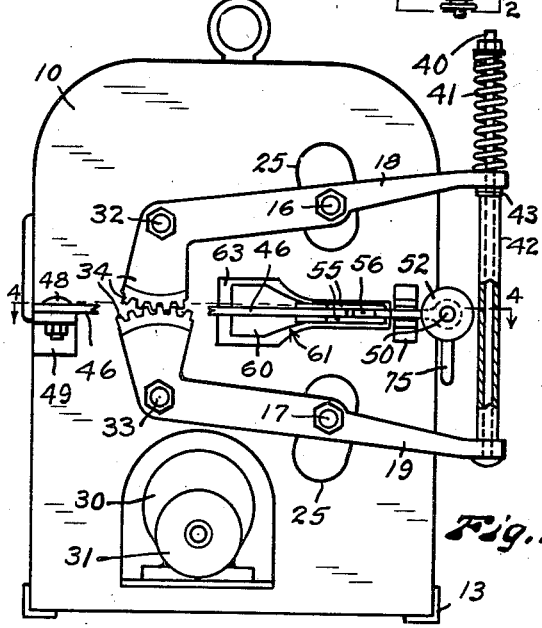
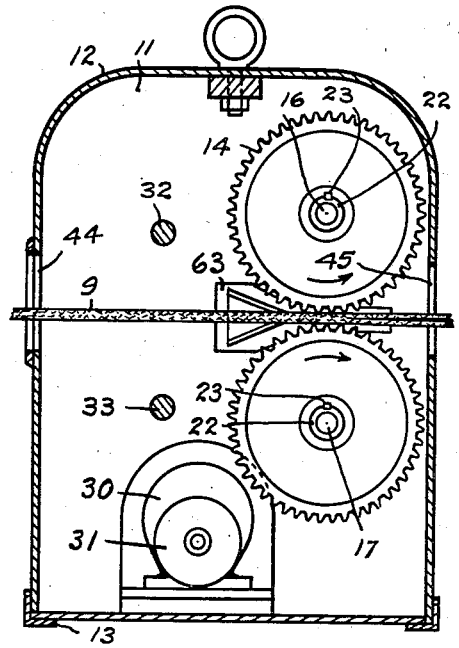
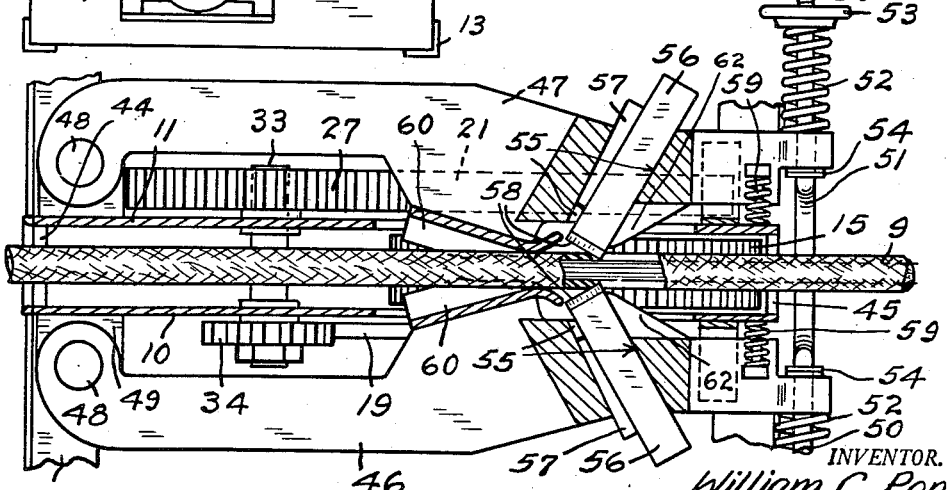
INVENTOR.
William C. Pope
BY Fred C. Matheny
ATTORNEY Dec. 24, 1946.                W. C. POPE                    2,413,192
                          CABLE SLITTING MACHINE
                          Filed Oct. 16, 1944            2 Sheets-Sheet 2

INVENTOR.
William C. Pope
BY Fred C. Matheny
ATTORNEY

Patented Dec. 24, 1946

2,413,192

UNITED STATES PATENT OFFICE 2,413,192

CABLE SLITTING MACHINE

William C. Pope, Seattle, Wash.

Application October 16, 1944, Serial No. 558,897

8 Claims. (Cl. 164—39)

This invention relates to a cable slitting machine and the present invention is in the nature of an improvement on the cable slitting machine disclosed in my Patent No. 2,360,363, issued October 17, 1944.

It is an object of this invention to provide a simple and efficient cable slitting machine that will slit the protective covering of a cable on two opposite sides to thereby open up the cable and make it very easy to salvage useful and valuable material contained in said cable.

Cables of the type used in communication and transmission of electric current usually comprise a plurality of metal wires disposed within a protective covering of insulating material such as lead or a composition of rubber and fabric or asbestos.

The covering used on large cables of this type is relatively thick and is tough and hard to cut in salvaging the cables.

There is a substantial amount of this cable ranging in diameter from three eighths to five inches to be salvaged. A portion of this is used or old cable and a portion of it is made up of short lengths of new cable which have been scrapped because they are too short to use.

It is an object of this invention to provide a simple and efficient machine for longitudinally slitting cable of this nature along two opposite sides and thus laying the cable open so as to facilitate the salvaging of the wires within the cable and the rubber or other material in the protective covering of said cable.

It is another object of this invention to provide a cable slitting machine having two driven spur wheels positioned with their circumferential portions close together and yieldingly supported for equalized movement toward and away from each other and adapted to receive and grip cable of different diameter and to flatten a cable and bulge the sides thereof and to move said cable past two oppositely positioned slitting knives by which the protective covering of the cable is longitudinally cut and laid open.

Another object of this invention is to provide a cable slitting machine in which a cable is fed between two opposed spaced apart knives that are floatingly supported for joint floating movement in two directions in a plane coaxial with the cable, whereby the joint floating movement of the knives in two directions provides self adjustment of the knives to compensate for varying positions of the cable.

Other objects of the invention will be apparent from the following description and accompanying drawings.

In the drawings

Fig. 1 is a top plan view of a cable slitting machine constructed in accordance with this invention.

Fig. 2 is a side elevation of the same looking in the direction of broken line 2—2 of Fig. 1.

Fig. 3 is a sectional view with parts in elevation looking in the direction of broken line 3—3 of Fig. 1.

Fig. 4 is a view partly in plan and partly in section on a larger scale than Fig. 2 and taken substantially on broken line 4—4 of Fig. 2 and showing the machine with a cable therein and the knives cutting into the cable.

Like reference numerals designate like parts throughout the several views.

Figure 5:
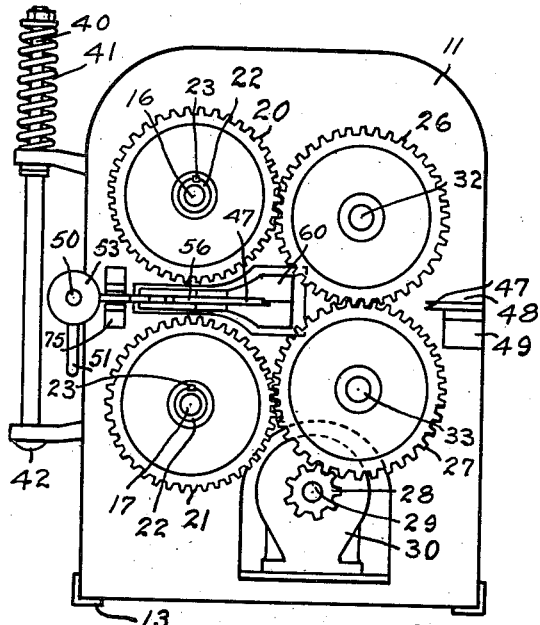
Fig. 5 is a side elevation of the machine looking in the direction 5—5 of Fig. 1 showing driving means.

This machine comprises an upright frame including two relatively rigid parallel side plates 10 and 11 that are spaced a short distance apart by marginal frame members 12 and that are mounted on base members 13.

Two toothed feed wheels or rollers 14 and 15 are mounted between the side plates 10 and 11. These feed wheels 14 and 15 are mounted on sleeves 22 that are rotatable on short shafts 16 and 17 respectively. These short shafts 16 and 17 are fixedly secured to lever arms 18 and 19 respectively. The lever arms 18 and 19 are positioned at one side of the machine adjacent the outer side of the side plate 10.

Two gear wheels 20 and 21 are mounted on the sleeves 22 on short shafts 16 and 17. These gear wheels 20 and 21 are positioned on the side of the machine opposite to the lever arms 18 and 19 and are secured to the feed wheels 14 and 15 through sleeves 22 and are used to drive the feed wheels.

One way of securing the gear wheels 20 and 21 to the feed wheels 14 and 15 so that said feed wheels will be driven by said gear wheels is to secure each gear wheel and feed wheel to its sleeve 22 as by key means 23.

Suitable openings 25 are formed in the side plates 10 and 11 to provide clearance for movement of the short shafts 16 and 17. These openings 25 are large enough to allow for a substantial amount of movement of the shafts 16 and 17, as the feed wheels 14 and 15 adjust themselves to pieces of cable of different size.

The gear wheels 20 and 21 mesh with two other gear wheels 26 and 27 respectively and these two other gear wheels 26 and 27 mesh with each other. A driving pinion 28 on the shaft 29 of a speed reduction gear 30 meshes with the gear wheel 27. The speed reduction gear 30 is driven by a motor 31. Speed reduction gear 30 and motor 31 are preferably set in the base portion of the machine which is suitably cut away to receive these parts.

The drive to the lower feed wheel 15 is transmitted from the pinion 28 through gear wheels 27 and 21. The drive to the upper feed wheel 14 is transmitted from the pinion 28 through the gear wheels 27, 26 and 20.

Gear wheels 26 and 27 are mounted on shafts 32 and 33 respectively that extend crosswise through the side frame plates 10 and 11 and serve as fulcrum members for the lever arms 18 and 19 at the opposite side of the machine from the gear wheels 26 and 27.

The lever arms 18 and 19 are interconnected with each other in such a manner as to compel equal angular movement of said lever arms in opposite directions. This will let the toothed wheels 14 and 15 that feed the cable 9 move toward and away from each other to firmly engage with pieces of cable of different diameters and at the same time will always keep the axis of the cable in the same place.

Figure 7:
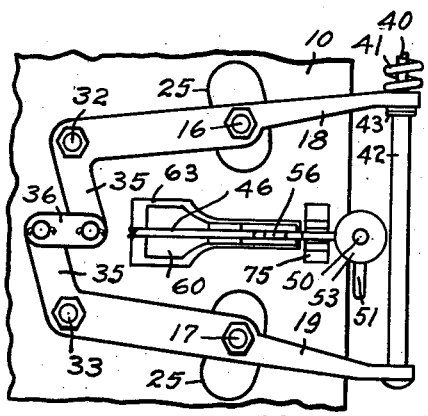
Figs. 7, 8 and 9 are detached fragmentary views in side elevation showing three different devices that may be used to compel equal movement of cable feed wheels in opposite directions.
Figure 9:
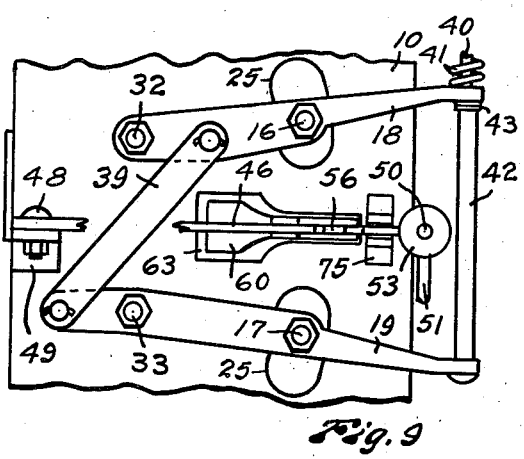
Figure 8:
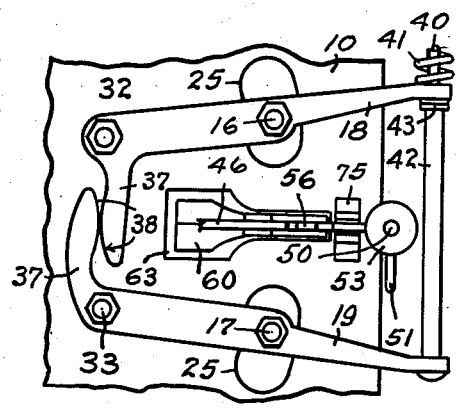

One way of interconnecting the lever arms 18 and 19 so as to provide for equal angular movement of these two lever arms is to provide them with intermeshing gear segments 34 as shown in Fig. 2. Another way is to provide on these arms rigid bell crank members 35 that extend toward each other and are connected with each other by a link 36 as shown in Fig. 7. Another way to interconnect arms 18 and 19 for equal angular movement in opposite directions is to provide on said arms rigid bell crank members 37 having curved surfaces 38 positioned in contact with each other, see Fig. 8. Still another way to interconnect these lever arms 18 and 19 for equal angular movement in opposite directions is to interconnect said lever arms by means of a diagonal link 39 as shown in Fig. 9.

The forward end portions of the lever arms 18 and 19 are connected with each other by a rod 40 that has a compression spring 41 on one end thereof. The compression spring 41 exerts a resilient force tending to draw the forward end portions of the lever arms 18 and 19 together. Thus is provided a balanced resilient force that holds the two feed wheels 14 and 15 in engagement with the cable 9. Preferably a sleeve 42 is provided on the rod 40 between the end portions of the two lever arms 18 and 19 to limit movement toward each other of these arms. Washers 43 may be used on the rod 40 along with the sleeve 42 to obtain a finer adjustment if desired. The stop members 42—43 prevent the feed wheels 14 and 15 from being drawn entirely together when there is no cable in the machine. This is important because cable slitting knives hereinafter described may extend between these feed wheels 14 and 15.

The cable 9 is fed into the machine through an opening 44 at the rear of the machine and after passing between the feed wheels 14 and 15 is discharged from the machine through an opening 45 at the front.

Two horizontal knife carrying arms 46 and 47 are provided at opposite sides of the machine and extend along outer sides of the frame plates 10 and 11 substantially in the horizontal plane occupied by the portion of the cable that is passing between the feed wheels.

Vertical pivots 48 connect the rear end portions of these knife carrying arms with brackets 49 that are rigid with the frame of the machine and extend sidewise therefrom. The front end portions of the knife carrying arms extend beyond the front edge of the machine and are floatingly connected with each other by a cross yoke having straight end portions 50 and a U shaped medial portion 51. The medial portion 51 of the yoke is made U shape to avoid interfering with the cable that is being discharged from the machine after said cable has been laid open on both sides.

One or more springs 52 are provided to yieldingly urge the forward end portions of the two knife carrying arms 46 and 47 together. Preferably I provide two of these springs 52, one on each straight portion 50 of the cross yoke 50—51 outwardly from the arms 46 and 47. A nut or handwheel 53 is threaded onto the outer end portion of each straight yoke member 50 to adjustably hold the spring 52.

The U shaped portion 51 of the yoke serves as a spacer for the two arms 46 and 47 and washers 54 may be used thereon if desired. Guide members 75 on the frame plates 10 and 11 prevent up and down movement of the front end portions of the knife carrying arms. Two opposed centering springs 59 are provided on opposite sides of the machine one between the knife arm 46 and side plate 10 and the other between the knife arm 47 and side plate 11. These springs 59 always bring the knife arms to the correct starting position when there is no cable in the machine.

Each knife carrying arm 46 and 47 is provided with an inclined passageway 55 of rectangular cross section for the reception of cable slitting means such as a knife 56. Preferably a tapered key or wedge 57 is used to hold the knife 56 in place.

The inner or cutting edge portion 58 of the knife 56 is formed at right angles to the longitudinal axis of the knife and is sharpened by grinding or beveling it on both sides. This forms a cutting edge 58 extending across the end of the knife and positioned at an angle to the longitudinal axis of the cable 9 that is to be slitted. When one corner portion of this cutting edge 58 becomes dulled by use the knife can be turned over and the other corner portion of the edge 58 used until it becomes dull. Thus, although only one corner portion of the blade 56 is used at any one time, the entire cutting edge can always be utilized before sharpening is necessary.

A V shaped cable guiding shoe 60 is carried by each knife carrying bar 46 and 47 to engage with the cable 9 just before said cable is engaged by the knives. These guide shoes 60 help to guide the cable to the feed wheels 14 and 15 and to the knives 56. Also they serve to gauge the depth of cut of the knives in the cable and prevent the knives from cutting too deeply. Portions of these V shaped cable guides are cut away as indicated at 61 to provide clearance for the feed wheels 14 and 15.

An inclined cable engaging member 62 is provided just outwardly from the cutting edge 58 of each blade 56. These inclined members 62 being oppositely positioned, will be engaged by the trailing end portion of a piece of cable that is leaving the machine and will act as shock absorbers to prevent any of the parts from being snapped together by the springs 52 as a piece of cable leaves the machine.

The plates 10 and 11 have openings 63 through which the knives 56 and guide members 60 and 62 operate.

Figure 10:
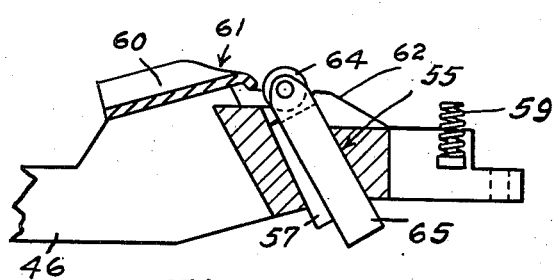
Fig. 10 is a fragmentary view partly in section and partly in plan showing part of a knife carrying arm equipped with a rolling type of cutting knife.

I also find that it is possible to use disc like rolling cutters 64 in place of the knives 56 to slit the cable 9. A rolling cutter 64 suitable for such use is shown in Fig. 10 and is rotatively mounted in a bracket 65 that will fit within the openings 55 in the knife carrying arms 46 and 47.

Figure 6:
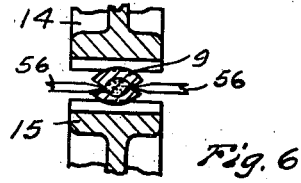
Fig. 6 is a fragmentary sectional detail showing how the feed wheels bulge the sides of the cable that the knife is cutting into.

In the operation of this machine the feed wheels 14 and 15 are driven in the direction indicated by the arrows in Fig. 3 and cable 9 is fed in through the opening 44 to these feed wheels. As the cable 9 passes between these feed wheels 14 and 15 it is flattened to a certain extent and the sides thereof are caused to bulge out, see Fig. 6, and are placed under stress. While the cable is thus flattened and the sides thereof are bulged these bulged sides are brought in contact with the opposed knives. The result is that the cable is easily slit by the knives and is laid open along two opposite sides. The cable can be moved through the machine at a speed of from seventy-five to one hundred twenty-five feet per minute and is discharged from the machine in such a condition that the protective covering or armor is readily separated from the core for salvaging any or all parts of either the covering or the core.

Obviously pieces of cable of any desired length and of wide variation in diameter may be slitted in this machine without requiring any adjustment of the machine. For instance, pieces of cable of mixed diameters varying from three eighths inch to five inches may be fed at random through one of these machines and each piece slitted from end to end without varying the adjustment of the machine.

Usually the protective coverings of cables of different diameters, within the range of this machine, will not vary enough in thickness to require adjustment of the knife as it is not objectionable if the knife enters the core of the cables of smaller diameter.

The foregoing description and accompanying drawings clearly disclose a preferred embodiment of this invention but it will be understood that this disclosure is merely illustrative and that changes in the invention may be made within the scope and spirit of the following claims.

I claim:

1. In a cable slitting means; knives having two oppositely disposed spaced apart cutting edges; means floatingly supporting said knives for joint floating movement in two directions; and means for continuously feeding said knives to provide continuous longitudinally extending slits on two opposite sides of said cable, the joint floating movement of the knives in two directions providing self adjustment of the knives to varying positions of the cable.

2. In a cable slitting machine, two spaced apart driven feed wheels adapted to grip and longitudinally move a cable; two knives having oppositely disposed spaced apart cutting edges positioned in the path of movement of the cable to provide continuous longitudinal slits in opposite sides of said cable; movable knife carrying means supporting said knives for movement toward and away from each other and for joint floating movement in a common plane that bisects the cable; and cable guiding means carried by said knife carrying means in advance of said knives.

3. In a cable slitting machine, two spaced apart driven feed wheels positioned to receive therebetween and grip and longitudinally move a cable, two knives having opposed spaced apart cutting edges positioned in the path of movement of the cable at substantially the location where the cable is gripped by said feed wheels; and means supporting said knives for joint transverse floating movement in two directions relative to said cable, the joint floating movement of said knives providing self adjustment of the knives to varying positions of the cable.

4. In a cable slitting machine, two spaced apart driven feed wheels positioned to receive therebetween and grip and longitudinally move a cable; two knives having opposed spaced apart inclined cutting edges extending between the feed wheels and positioned in the path of movement of the cable alongside of said feed wheels at substantially the location where the cable is gripped and flattened by said feed wheels to provide continuous longitudinal slits along two opposite sides of said cable, knife carrying means floatingly supported by said knives; and cable guiding means carried by the knife carrying means in advance of the knives.

5. In a cable slitting machine, two spaced apart driven feed wheels positioned to receive therebetween and grip and longitudinally move a cable; bearing means supporting said feed wheels for movement toward and away from each other; means compelling equal and opposite movement of said bearing means whereby the gripped portions of cables of different sizes will be maintained in the same plane when in the grip of said feed wheels; and two knives having opposed spaced apart cutting edges positioned in the path of movement of the cable at substantially the location where the cable is gripped by said feed wheels to provide continuous longitudinal slits in said cable along two opposite sides.

6. In a cable slitting machine a frame having two upright spaced apart side plates; two lever arms pivotally mounted on said side plates; means interconnecting said two lever arms to compel equal and opposite angular movement of said two lever arms; two bearing shafts carried by said lever arms; two driven feed wheels rotatively mounted on said bearing shafts adapted to grip and longitudinally move a cable; resilient means connected with said two levers yieldingly urging said feed wheels toward each other; two knife carrying arms pivotally mounted on said frame on opposite sides of said feed wheels and movable toward and away from said wheels; means yieldingly urging said knife carrying arms toward said feed wheels; and two knives carried by the respective knife carrying arms and having opposed cutting edges extending into the path of a cable at substantially the location where it is gripped by said feed wheels.

7. In a cable slitting machine, a frame having two upright spaced apart side plates; two lever arms pivotally mounted on said side plates; means interconnecting said two lever arms to compel equal and opposite angular movement of said two lever arms; two bearing shafts carried by said lever arms; two feed wheels rotatively mounted on said bearing shafts adapted to grip and longitudinally move a cable; means for driving said feed wheels at the same speed and in opposite directions; resilient means connected with said two levers yieldingly urging said feed wheels toward each other; two knife carrying arms pivotally mounted on said frame on opposite sides of said feed wheels and movable toward and away from said feed wheels; means yieldingly urging said knife carrying arms toward said feed wheels; two knives carried by the respective knife carrying arms and having opposed cutting edges extending into the path of a cable at substantially the location where it is gripped by said feed wheels; and cable guiding means carried by the knife carrying arms in advance of said knives.

8. In a cable slitting machine, a frame including two upright spaced apart side plates; two lever arms pivotally mounted on said side plates; means interconnecting said two lever arms to compel equal and opposite angular movement thereof; two bearing shafts carried by said lever arms; two feed wheels rotatively mounted on said bearing shafts adapted to grip and longitudinally move a cable; means for driving both of said feed wheels at the same speed and in opposite directions; resilient means connected with said two levers yieldingly urging said two feed wheels toward each other; two knife carrying arms positioned at opposite sides of said frame and each pivotally connected at one end to said frame; yoke means floatingly connecting the movable end portions of said knife carrying arms with each other; spring means on said yoke means yieldingly urging said knife carrying arms together; other spring means yieldingly urging said two floating knife carrying arms into positions at substantially equal distances from the medial plane of said feed wheels; and two knives carried by the respective knife carrying arms and having opposed cutting edges extending into the path of a cable substantially at the location where said cable is gripped by said feed wheels.

WILLIAM C. POPE.